(12) United States Patent
McDaniel et al.

(10) Patent No.: US 6,391,816 B1
(45) Date of Patent: May 21, 2002

(54) ORGANOMETAL COMPOUND CATALYST

(75) Inventors: Max P. McDaniel; Kathy S. Collins, both of Bartlesville; Anthony P. Eaton, Dewey; Elizabeth A. Benham, Bartlesville; Joel L. Martin, Bartlesville; Michael D. Jensen, Bartlesville; Gil R. Hawley, Dewey, all of OK (US)

(73) Assignee: Phillips Petroleum, Bartlesville, OK (US)

( * ) Notice: Subject to any disclaimer, the term of this patent is extended or adjusted under 35 U.S.C. 154(b) by 0 days.

(21) Appl. No.: 09/427,913

(22) Filed: Oct. 27, 1999

(51) Int. Cl.$^7$ .................... B01J 31/00; B01J 37/00; C08F 4/02; C08F 4/60
(52) U.S. Cl. .................. 502/107; 502/113; 502/128; 502/129; 502/118
(58) Field of Search ................ 502/113, 118, 502/128, 129, 107

(56) References Cited

U.S. PATENT DOCUMENTS

| | | | | |
|---|---|---|---|---|
| 4,525,551 A | * | 6/1985 | Schmidt ................. | 502/107 |
| 4,607,019 A | | 8/1986 | Best ..................... | 502/119 |
| 4,855,271 A | * | 8/1989 | McDaniel et al. ......... | 502/107 |
| 5,051,388 A | * | 9/1991 | Buehler et al. ........... | 502/107 |
| 5,059,570 A | * | 10/1991 | Bailly et al. ............ | 502/107 |
| 5,070,054 A | * | 12/1991 | Bailly et al. ............ | 502/107 |
| 5,070,055 A | * | 12/1991 | Schramm et al. .......... | 502/107 |
| 5,171,798 A | | 12/1992 | McDaniel et al. | |
| 5,204,304 A | * | 4/1993 | Kuo et al. ............... | 502/129 |
| 5,258,342 A | * | 11/1993 | Luciani et al. ........... | 502/107 |
| 5,466,766 A | * | 11/1995 | Patsidis et al. .......... | 502/152 |
| 5,496,782 A | | 3/1996 | Zandona ................. | 502/113 |
| 5,532,326 A | * | 7/1996 | Dall'Occo et al. ........ | 502/107 |
| 5,543,376 A | | 8/1996 | Bergmeister | |
| 5,585,447 A | * | 12/1996 | Adisson et al. .......... | 502/107 |
| 5,703,181 A | | 12/1997 | Tashiro et al. | |
| 5,705,578 A | | 1/1998 | Peifer et al. | |
| 6,100,353 A | * | 8/2000 | Lynch et al. ............. | 502/109 |
| 6,239,059 B1 | | 5/2001 | Saudemont et al. | |
| 6,300,271 B1 | * | 10/2001 | McDaniel et al. ........ | 502/113 |

FOREIGN PATENT DOCUMENTS

| | | |
|---|---|---|
| EP | 0 628 574 | 12/1944 |
| EP | 0 416 928 | 3/1991 |

OTHER PUBLICATIONS

Hongsang Ang and Tobin J. Marks, "Supported Organometallics. Highly Electrophilic Cationic Metallocene hydrogenation and Polymerization Catalysts Formed via Protonolytic Chemisorption on Sulfated Zirconia," J. Am. Chem. Soc., 120(51), 13533–13534, 1998.

* cited by examiner

*Primary Examiner*—Mark L. Bell
*Assistant Examiner*—J. Pasterczyk
(74) *Attorney, Agent, or Firm*—Polly C. Owen

(57) ABSTRACT

This invention provides catalyst compositions that are useful for polymerizing at least one monomer to produce a polymer. This invention also provides catalyst compositions that are useful for polymerizing at least one monomer to produce a polymer, wherein said catalyst composition comprises a post-contacted organometal compound, a post-contacted organoaluminum compound, and a post-contacted treated solid oxide compound. The post-contacted treated solid oxide compound has been treated with a vanadium compound, calcied, then treated with a halogen-containing compound.

35 Claims, No Drawings

ORGANOMETAL COMPOUND CATALYST

FIELD OF THE INVENTION

This invention is related to the field of organometal compound catalysts.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1960. However, their low productivity did not allow them to be commercialized. About 1975, it was discovered that contacting one part water with one part trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Borate compounds have been use in place of large amounts of methyl aluminoxane. However, this is not satisfactory, since borate compounds are very sensitive to poisons and decomposition, and can also be very expensive.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniformed particles are desirable because they improve the efficiency of polymer production and transportation. Efforts have been made to produce heterogeneous metallocene catalysts; however, these catalysts have not been entirely satisfactory.

Therefore, the inventors provide this invention to help solve these problems.

SUMMARY OF THE INVENTION

An object of this invention is to provide a process that produces a catalyst composition that can be used to polymerize at least one monomer to produce a polymer.

Another object of this invention is to provide the catalyst composition.

Another object of this invention is to provide a process comprising contacting at least one monomer and the catalyst composition under polymerization conditions to produce the polymer.

Another object of this invention is to provide an article that comprises the polymer produced with the catalyst composition of this invention.

In accordance with one embodiment of this invention, a process to produce a catalyst composition is provided. The process comprises (or optionally, "consists essentially of", or "consists of") contacting an organometal compound, an organoaluminum compound, and a treated solid oxide compound to produce the catalyst composition, wherein the organometal compound has the following general formula:

$$(X^1)(X^2)(X^3)(X^4)M^1$$

wherein $M^1$ is selected from the group consisting of titanium, zirconium, and hafnium;

wherein $(X^1)$ is independently selected from the group consisting of cyclopentadienyls, indenyls, fluorenyls, substituted cyclopentadienyls, substituted indenyls, and substituted fluorenyls;

wherein substituents on the substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen;

wherein at least one substituent on $(X^1)$ can be a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein $(X^2)$ is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substituents on $(X^2)$ are selected from the group consisting of aliphatic groups, cyclic groups, combinations of aliphatic groups and cyclic groups, silyl groups, alkyl halide groups, halides, organometallic groups, phosphorus groups, nitrogen groups, silicon, phosphorus, boron, germanium, and hydrogen;

wherein at least one substituent on $(X^2)$ can be a bridging group which connects $(X^1)$ and $(X^2)$;

wherein the organoaluminum compound has the following general formula:

$$Al(X^5)_n(X^6)_{3-n}$$

wherein $(X^5)$ is a hydrocarbyl having from 1–20 carbon atoms;

wherein $(X^6)$ is a halide, hydride, or alkoxide;

wherein "n" is a number from 1 to 3 inclusive; and wherein the treated solid oxide compound comprises a halogen, vanadium, and a solid oxide compound;

wherein the halogen is selected from the group consisting of chlorine and bromine;

wherein the solid oxide compound is selected from the group consisting of alumina, aluminophosphate, aluminosilicate, and mixtures thereof.

In accordance with another embodiment of this invention, a process is provided comprising contacting at least one monomer and the catalyst composition under polymerization conditions to produce a polymer.

In accordance with another embodiment of this invention, an article is provided. The article comprises the polymer produced in accordance with this invention.

These objects, and other objects, will become more apparent to those with ordinary skill in the art after reading this disclosure.

DETAILED DESCRIPTION OF THE INVENTION

Organometal compounds used in this invention have the following general formula:

$$(X^1)(X^2)(X^3)(X^4)M^1$$

In this formula, $M^1$ is selected from the group consisting of titanium, zirconium, and hafnium. Currently, it is most preferred when $M^1$ is zirconium.

In this formula, $(X^1)$ is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

Substituents on the substituted cyclopentadienyls, substituted indenyls, and substituted fluorenyls of $(X^1)$ can be selected independently from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

In this formula, $(X^3)$ and $(X^4)$ are independently selected from the group consisting of (hereafter "Group OMC-II") halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to about 10 carbon atoms. However, it is most preferred when $(X^3)$ and $(X^4)$ are selected from the group consisting of fluoro, chloro, and methyl.

In this formula, $(X^2)$ can be selected from either Group OMC-I or Group OMC-II.

At least one substituent on $(X^1)$ or $(X^2)$ can be a bridging group that connects $(X^1)$ and $(X^2)$, as long as the bridging group does not substantially, and adversely, affect the activity of the catalyst composition. Suitable bridging groups include, but are not limited to, aliphatic groups, cyclic groups, combinations of aliphatic groups and cyclic groups, phosphorous groups, nitrogen groups, organometallic groups, silicon, phosphorus, boron, and germanium.

Suitable examples of aliphatic groups are hydrocarbyls, such as, for example, paraffins and olefins. Suitable examples of cyclic groups are cycloparaffins, cycloolefins, cycloacetylenes, and arenes. Suitable organometalic groups include, but are not limited to, substituted silyl derivatives, substituted tin groups, substituted germanium groups, and substituted boron groups.

Various processes are known to make these organometal compounds. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such organometal compounds are as follows:

bis(cyclopentadienyl)hafnium dichloride;

bis(cyclopentadienyl)zirconium dichloride;

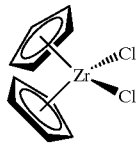

1,2-ethanediylbis($\eta^5$-1-indenyl)di-n-butoxyhafnium;

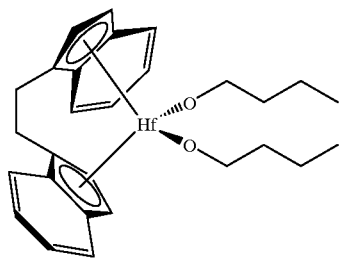

1,2-ethanediylbis($\eta^5$-1-indenyl)dimethylzirconium;

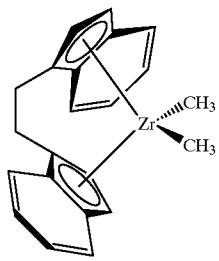

3,3-pentanediylbis($\eta^5$-4,5,6,7-tetrahydro-1-indenyl) hafbium dichloride;

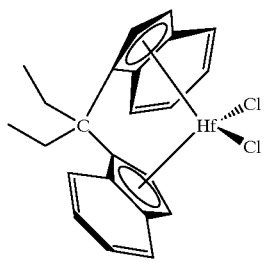

methylphenylsilylbis($\eta^5$-4,5,6,7-tetrahydro-1-indenyl) zirconium dichloride;

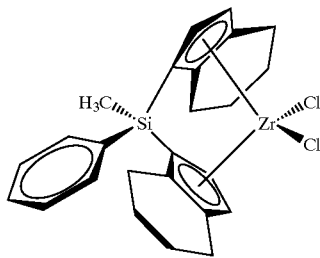

bis(n-butylcyclopentadienyl)di-t-butylamidohafnium;

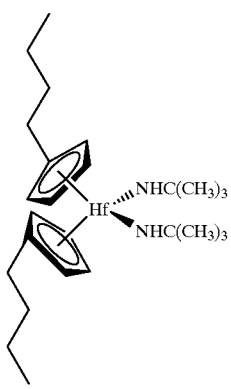

bis(n-butylcyclopentadienyl)zirconium dichloride;

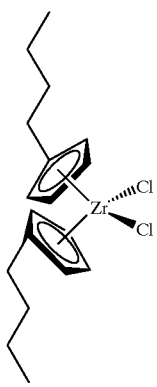

dimethylsilylbis(1-indenyl)zirconium dichloride;

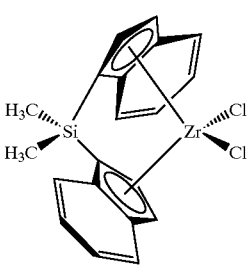

nonyl(phenyl)silylbis(1-indenyl)hafnium dichloride;

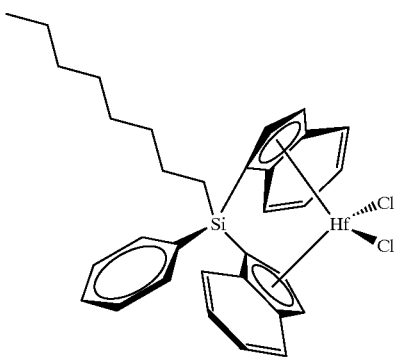

dimethylsilylbis($\eta^5$-4,5,6,7-tetrahydro-1-indenyl) zirconium dichloride;

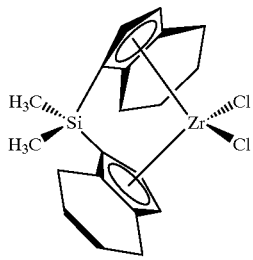

dimethylsilylbis(2-methyl-1-indenyl)zirconium dichloride;

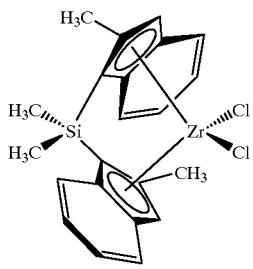

1,2-ethanediylbis(9-fluorenyl)zirconium dichloride;

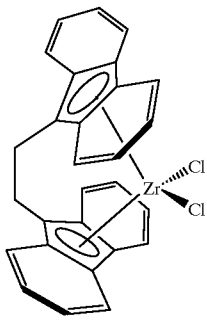

indenyl diethoxy titanium(IV) chloride;

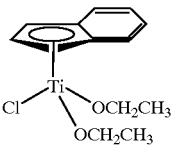

(isopropylamidodimethylsilyl)cyclopentadienyltitanium dichloride;

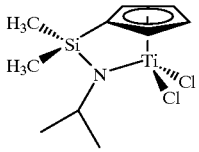

bis(pentamethylcyclopentadienyl)zirconium dichloride;

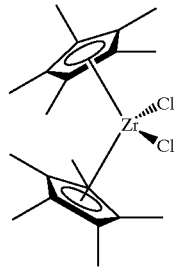

bis(indenyl) zirconium dichloride;

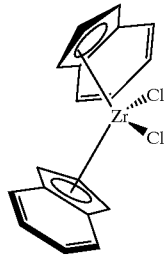

methyloctylsilyl bis (9-fluorenyl) zirconium dichloride;

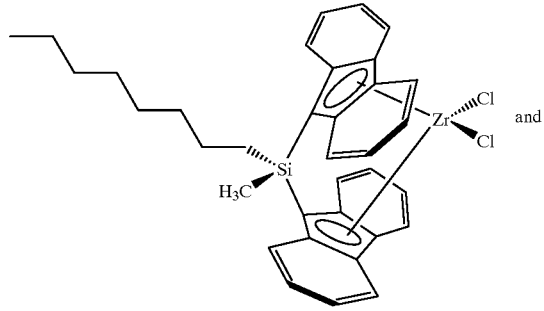 and bis-[1-(N,N-diisopropylamino)boratabenzene] hydridozirconium trifluoromethylsulfonate

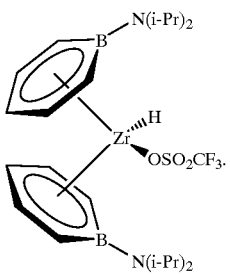

Preferably, the organometal compound is selected from the group consisting of bis(n-butylcyclopentadienyl)zirconium dichloride;

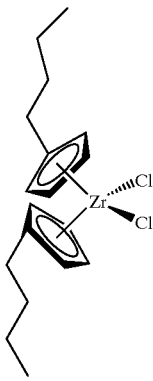

bis(indenyl)zirconium dichloride;

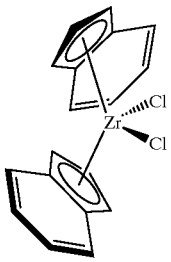

dimethylsilylbis(1-indenyl) zirconium dichloride;

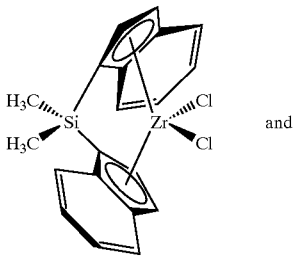

and methyloctylsilylbis(9-fluorenyl)zirconium dichloride

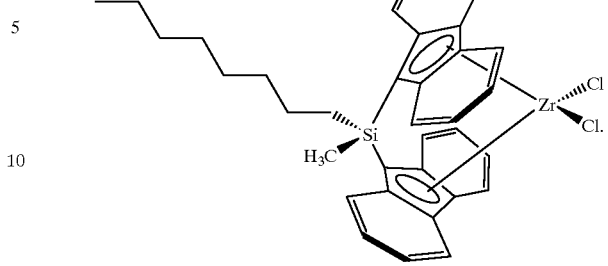

Organoaluminum compounds have the following general formula:

$$Al(X^5)_n(X^6)_{3-n}$$

In this formula, $(X^5)$ is a hydrocarbyl having from 1 to about 20 carbon atoms. Currently, it is preferred when $(X^5)$ is an alkyl having from 1 to about 10 carbon atoms. However, it is most preferred when $(X^5)$ is selected from the group consisting of methyl, ethyl, propyl, butyl, and isobutyl.

In this formula, $(X^6)$ is a halide, hydride, or alkoxide. Currently, it is preferred when $(X^6)$ is independently selected from the group consisting of fluoro and chloro. However, it is most preferred when $(X^6)$ is chloro.

In this formula, "n" is a number from 1 to 3 inclusive. However, it is preferred when "n" is 3.

Examples of such compounds are as follows:

trimethylaluminum;
triethylaluminum (TEA);
tripropylaluminum;
diethylaluminum ethoxide;
tributylaluminum;
diisobutylaluminum hydride;
tiisobutylaluminum hydride;
triisobutylaluminum; and
diethylaluminum chloride.

Currently, TEA is preferred.

The treated solid oxide compound comprises a halogen, vanadium, and a solid oxide compound. The halogen is selected from the group consisting of chlorine and bromine. Generally, the solid oxide compound is selected from the group consisting of alumina, aluminophosphate, aluminosilicate, and mixtures thereof. Preferably, the solid oxide compound is alumina.

Generally, the surface area of the solid oxide compound is from about 100 to about 1000 m²/g, preferably, from about 200 to about 800 m²/g, and most preferably, from 250 to 600 m²/g.

The pore volume of the solid oxide compound is typically greater than about 0.5 cc/g, preferably, greater than about 0.8 cc/g, and most preferably, greater than 1.0 cc/g.

To produce the treated solid oxide compound, at least one vanadium-containing compound is contacted with the solid oxide compound by any means known in the art to produce a vanadium-containing solid oxide compound. Generally, the solid oxide compound is contacted with an aqueous or organic solution of the vanadium-containing compound prior to calcination. For example, the vanadium can be added to the solid oxide compound by forming a slurry of the solid oxide compound in a solution of the vanadium-containing compound and a suitable solvent such as alcohol or water. Particularly suitable are one to three carbon atom alcohols because of their volatility and low surface tension. A suitable amount of the solution is utilized to provide the desired concentration of vanadium after drying. Drying can be effected by any method known in the art. For example, said drying can be completed by suction filtration followed by evaporation, vacuum drying, spray drying, or flash drying.

Any vanadium-containing compound known in the art that can impregnate the solid oxide compound with vanadium can be used in this invention. The vanadium-containing compound can be selected from the group consisting of vanadium salts and organovanadium compounds. Suitable vanadium salts include, but are not limited to, ammonium vanadate, vanadyl sulfate, vanadium dichloride, vanadium trichloride, and vanadium tetrabromide. Suitable organovanadium compounds include, but are not limited to, vanadium acetylacetonate, vanadium propoxide, vanadium acetate, and mixtures thereof. Generally, the amount of vanadium present in the vanadium-containing solid oxide compound is in a range of about 0.1 to about 10 millimoles per gram of vanadium-containing solid oxide compound before calcining. Preferably, the amount of vanadium present in the vanadium-containing solid oxide compound is in a range of about 0.5 to about 5 millimoles per gram of vanadium-containing solid oxide compound before calcining. Most preferably, the amount of vanadium present in the vanadium-containing solid oxide compound is in a range of about 1 to 3 millimoles per gram of vanadium-containing solid oxide compound before calcining.

After the solid oxide compound is combined with the vanadium-containing compound to produce the vanadium-containing solid oxide compound, it is then calcined for about 1 minute to about 100 hours, preferably from about 1 hour to about 50 hours, and most preferably, from 3 to 20 hours. Generally, the calcining is conducted at a temperature in the range of about 200° C. to about 900° C., preferably from about 300° C. to about 800° C., and most preferably, from 400° C. to 700° C. The calcning can be conducted in any suitable ambient. Generally, the calcining can be completed in an inert atmosphere. Alternatively, the calcining can be completed in an oxidizing atmosphere, such as, oxygen or air, or a reducing atmosphere, such as, hydrogen or carbon monoxide.

After or during calcining, the vanadium-containing solid oxide compound is contacted with a halogen-containing compound. The halogen-containing compound is selected from the group consisting of chlorine-containing compounds and bromine-containing compounds. The halogen-containing compound can be in a liquid phase, or preferably, a vapor phase. The vanadium-containing solid oxide compound can be contacted with the halogen-containing compound by any means known in the art. Preferably, the halogen-containing compound can be vaporized into a gas stream used to fluidize the vanadium-containing solid oxide compound during calcining. The vanadium-containing solid oxide compound is contacted with the halogen-containing compound generally from about 1 minute to about 10 hours, preferably, from about 5 minutes to about 2 hours, and most preferably, from 30 minutes to 3 hours. Generally, the vanadium-containing solid oxide compound is in contact with the halogen-containing compound at a temperature in a range of about 200° C. to about 900° C., preferably, about 300° C. to about 800° C., and most preferably, 400° C. to 700° C. Any type of suitable ambient can be used to contact the vanadium-containing solid oxide compound and the halogen-containing compound. Preferably, an inert atmosphere is used. Alternatively, an oxidizing atmosphere or a reducing atmosphere can be utilized.

Any chlorine-containing compounds or bromine-containing compounds which can impregnate the vanadium-containing solid oxide compound can be used in this invention. Suitable halogen-containing compounds include volatile or liquid organic chloride or bromide compounds and inorganic chloride or bromide compounds. Organic chloride or bromide compounds can be selected from the group consisting of carbon tetrachloride, chloroform, dichloroethane, hexachlorobenzene, trichloroacetic acid, bromoform, dibromomethane, perbromopropane, and mixtures thereof. Inorganic chloride or bromide compounds can be selected from the group consisting of gaseous hydrogen chloride, silicon tetrachloride, tin tetrachloride, titanium tetrachloride, aluminum trichloride, boron trichloride, thionyl chloride, sulfuryl chloride, hydrogen bromide, boron tribromide, silicon tetrabromide, and mixtures thereof Additionally, chlorine and bromine gas can be used. Optionally, a fluorine-containing compound can also be included when contacting the vanadium-containing solid oxide compound with the halogen-containing compound to achieve higher activity in some cases.

The amount of the halogen present in the treated solid oxide compound is generally in the range of about 2 to about 150% by weight, preferably about 10% to about 100% by weight, and most preferably, 15% to 75% by weight, where the weight percents are based on the weight of the treated solid oxide compound before calcining.

The catalyst compositions of this invention can be produced by contacting the organometal compound, the organoaluminum compound, and the treated solid oxide compound, together. This contacting can occur in a variety of ways, such as, for example, blending. Furthermore, each of these compounds can be fed into a reactor separately, or various combinations of these compounds can be contacted together before being further contacted in the reactor, or all three compounds can be contacted together before being introduced into the reactor.

Currently, one method is to first contact the organometal compound and the treated solid oxide compound together, for about 1 minute to about 24 hours, preferably, 1 minute to 1 hour, at a temperature from about 10° C. to about 200° C., preferably 15° C. to 80° C., to form a first mixture, and then contact this first mixture with an organoalunminum compound to form the catalyst composition.

Another method is to precontact the organometal compound, the organoaluminum compound, and the treated solid oxide compound before injection into a polymerization reactor for about 1 minute to about 24 hours, preferably, 1 minute to 1 hour, at a temperature from about 10° C. to about 200° C., preferably 20° C. to 80° C.

A weight ratio of the organoaluminum compound to the treated solid oxide compound in the catalyst composition ranges from about 5:1 to about 1:1000, preferably, from about 3:1 to about 1:100, and most preferably, from 1:1 to 1:50.

A weight ratio of the treated solid oxide compound to the organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

After contacting, the catalyst composition comprises a post-contacted organometal compound, a post-contacted organoaluminum compound, and a post-contacted treated solid oxide compound. It should be noted that the post-contacted treated solid oxide compound is the majority, by weight, of the catalyst composition. Often times, specific components of a catalyst are not known, therefore, for this invention, the catalyst composition is described as comprising post-contacted compounds.

A weight ratio of the post-contacted organoaluminum compound to the post-contacted treated solid oxide compound in the catalyst composition ranges from about 5:1 to about 1:1000, preferably, from about 3:1 to about 1:100, and most preferably, from 1:1 to 1:50.

A weight ratio of the post-contacted treated solid oxide compound to the post-contacted organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

The catalyst composition of this invention has an activity greater than a catalyst composition that uses the same organometal compound, and the same organoaluminum compound, but uses alumina, silica, or silica-alumina that has been impregnated with chloride only as shown in comparative examples 8 and 9. This activity is measured under slurry polymerization conditions, using isobutane as the diluent, and with a polymerization temperature of about 50 to about 150° C., and an ethylene pressure of about 400 to about 800 psig. When comparing activities, the polymerization runs should occur at the same polymerization conditions. The reactor should have substantially no indication of any wall scale, coating or other forms of fouling.

However, it is preferred if the activity is greater than 1000 grams of polymer per gram of treated solid oxide compound per hour, more preferably greater than 2000, even more preferably greater than 3000, and most preferably greater than 5,000. This activity is measured under slurry polymerization conditions, using isobutane as the diluent, and with a polymerization temperature of 90° C., and an ethylene pressure of 550 psig. The reactor should have substantially no indication of any wall scale, coating or other forms of fouling.

In a second embodiment of this invention, the treated solid oxide compound can be post-treated with at least one compound selected from the group consisting of organovanadium compounds, vanadium halide compounds, organotitanium compounds, titanium halide compounds, organoaluminum compounds, organoaluminum halide compounds, and mixtures thereof, as is frequently done in the preparation of Ziegler type catalysts. This process is disclosed in U.S. Pat. No. 4,607,019, which is herein incorporated by reference.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no borate compounds need to be used in order to form the catalyst composition. In summary, this means that the catalyst composition, which is heterogenous, and which can be used for polymerizing monomers, can be easily and inexpensively produced because of the substantial absence of any aluminoxane compounds or borate compounds. It should be noted that fluoroorganic boron compounds, such as fluorophenyl borate, organochromium compounds, and $MgCl_2$ are not needed in order to form the catalyst composition. Although aluminoxane, borate compounds, fluoroorganic boron compounds, organochromium compounds, or $MgCl_2$ are not needed in the preferred embodiments, these compounds can be used in other embodiments of this invention.

In another embodiment of this invention, a process comprising contacting at least one monomer and the catalyst composition to produce a polymer is provided. The term "polymer" as used in this disclosure includes homopolymers and copolymers. The catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

When a homopolymer is desired, it is most preferred to polymerize ethylene or propylene. When a copolymer is desired, the copolymer comprises monomer residues and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-pentene, 1-hexene, 1-octene, and other olefms and conjugated or nonconjugated diolefins such as 1,3-butadiene, isoprene, piperylene, 2,3-dimethyl-1,3-butadiene, 1,4-pentadiene, 1,7-hexadiene, and other such diolefins and mixtures thereof. When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally from about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art, such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The catalyst compositions used in this process produce good quality polymer particles without substantially fouling the reactor. When the catalyst composition is to be used in a loop reactor zone under slurry polymerization conditions, it is preferred when the particle size of the solid oxide compound is in the range of about 10 to about 1000 microns, preferably about 25 to about 500 microns, and most preferably, 50 to 200 microns, for best control during polymerization.

In a more specific embodiment of this invention, a process is provided to produce a catalyst composition, the process comprising (optionally, "consisting essentially of", or "consisting of"):

(1) contacting alumina with an aqueous solution containing vanadyl sulfate to produce a vanadium-containing alumina having from 1 to 3 millimoles of vanadium per gram of vanadium-containing alumina before calcining;

(2) calcning the vanadium-containing alumina at a temperature within a range of 400 to 700° C. for 3 to 20 hours to produce a calcined composition;

(3) contacting the calcined composition with carbon tetrachloride for 10 minutes to 30 minutes to produce a chlorided, vanadium-containing alumina having from 15% to 75% by weight chlorine based on the weight of the chlorided, vanadium-containing alumina before calcining;

(4) combining the chlorided, vanadium-containing alumina and bis(n-butylcyclopentadienyl) zirconium dichloride at a temperature within the range of 15° C. to 80° C. to produce a mixture; and (5) after between 1 minute and 1 hour, combining the mixture and triethylaluminum to produce the catalyst composition.

Hydrogen can be used with this invention in a polymerization process to control polymer molecular weight.

In addition to the other polymerization parameters already described previously in this disclosure, polymerization can be conducted in the presence of a chlorocarbon activation compound in a reactor zone as is known in the art with vanadium containing catalysts. Suitable chlorocarbon activators include, but are not limited to, chloroform, tetrachloroethane, dichlorodifluoromethane, and mixtures thereof. The concentration of these chlorocarbon activation compounds can vary from a few parts per million (ppm) to a few percent based on the weight of the polymerization diluent. This process is disclosed in U.S. Pat. No. 4,607,019, which is herein incorporated by reference.

One of the features of this invention is that the treated solid oxide compound activates the organometal compound much more efficiently than a oxide compound that does not contain vanadium. Thus, the vanadium contributes to the activation of the organometal compound. A second feature of this invention is that the vanadium-containing solid oxide compound is a polymerization catalyst in it's own right, providing a high molecular weight component onto an otherwise symmetrical molecular weight distribution of the organometal compound. This component, or skewed molecular weight distribution, imparts higher melt strength and shear response to the polymer than could be obtained from an organometal compound alone. Although the molecular weight breadth, as measured by polydispersity, Mw (weight average molecular weight)/Mn (number average molecular weight), is usually narrow, in the 2.0 to 3.5 range, the shear ratio (high load melt index (HLMI)/melt index (MI)) is larger than obtained in the absence of vanadium, usually about 18 to about 25.

After the polymers are produced, they can be formed into various articles, such as, for example, household containers and utensils, film products, drums, fuel tanks, pipes, geomembranes, and liners. Various processes can form these articles. Usually, additives and modifiers are added to the polymer in order to provide desired effects. It is believed that by using the invention described herein, articles can be produced at a lower cost, while maintaining most, if not all, of the unique properties of polymers produced with metallocene catalysts.

EXAMPLES

Testing Methods

A "Quantachrome Autosorb-6 Nitrogen Pore Size Distribution Instrument" was used to determined surface area and pore volume. This instrument was acquired from the Quantachrome Corporation, Syosset, N.Y.

Melt Index (MI) (g/10 min) was determined using ASTM D1238-95 at 190° C. with a 2,160 gram weight.

High Load Melt Index (HLMI)(g/10 min) was determined using ASTM D1238, Condition E at 190° C. with a 21,600 gram weight.

Preparation of Oxide Compounds

Alumina was obtained as Ketjen grade B from Akzo Nobel, having a pore volume of about 1.78 cc/g and a surface area of about 340 m$^2$/g. Silica was obtained as Davison grade 952 from W. R. Grace, having a pore volume of about 1.6 cc/g and a surface area of about 300 m$^2$/g. Silica-alumina was obtained as MS 13-110 from W. R. Grace having 13% by weight alumina and 87% by weight silica and having a pore volume of about 1.2 cc/g and a surface area of about 350 m$^2$/g.

These oxide compounds were prepared by the following method and were used in the control experiments. About 10 grams of each oxide compound described previously were placed in a 1.75 inch quartz tube fitted with a sintered quartz disk at the bottom. While the oxide compound was placed on the disk, a gas stream of dry air was blown up through the disk at the linear rate of about 1.6 to about 1.8 standard cubic feet per hour to fluize the oxide compound. An electric furnace around the quartz tube was then turned on, and the temperature was raised at the rate of 400° C. per hour up to the desired temperature, usually 600° C. At that temperature, the oxide compound was allowed to fluidize for three hours in the dry air. The alumina, silica, or silica-alumina were then collected and stored under dry nitrogen and did not receive any exposure to the atmosphere.

A chlorided alumina was prepared by the same method as discussed previously for the alumina, silica, and silica-alumina, except after the calcining step, the alumina was contacted with a halogen-containing compound. While still at 600° C., the gas stream was changed from air to nitrogen and about 2.3 milliliters of carbon tetrachloride were injected into the gas stream ahead of the alumina. As the carbon tetrachloride was carried up through the alumina by the flowing nitrogen, it reacted at 600° C. with the alumina to produce a chlorided alumina.

A treated solid oxide compound, specifically a chlorided, vanadium-containing alumina, was produced by first treating the alumina prepared as discussed previously with a vanadium-containing compound and then contacting it with a halogen-containing compound. Thus, a sample of the alumina was impregnated with about twice as much of an aqueous solution containing 1 millimole of vanadyl sulfate per gram of alumina to produce a vanadium-containing alumina. For example, to about 50 grams of Ketjen B alumina were added about 100 milliliters of a solution containing 0.05 moles of vanadyl sulfate. This gave the consistency of wet sand. The vanadium-containing alumina was then dried in a vacuum oven overnight at 110° C. under about half an atmosphere of vacuum. Later, 10 gram portions of the vanadium-containing alumina were then calcined and contacted with carbon tetrachloride as described previously to produce a chlorided, vanadium-containing alumina (treated solid oxide compound).

Description ofPolvmerization Runs:

Polymerization runs were made in a 2.2 liter steel reactor equipped with a marine stirrer running at 400 revolutions per minute (rpm). The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments.

Unless otherwise stated, first, a small amount (0.1 to 1.0 grams normally) of an oxide compound or the inventive treated solid oxide compound was charged under nitrogen to the dry reactor. Next, two milliliters of an organometal compound solution were added by syringe containing 0.5 grams of an organometal compound (usually bis(n-butylcyclopentadienyl) zirconium dichloride) per 100 milliliters of toluene. Then, 1.2 liters of isobutane liquid were charged to the reactor, and the reactor was brought up to 90° C. One milliliter of organoaluminum compound (15% by weight triethylaluminum) was added midway during the isobutane addition. Finally, ethylene was added to the reactor to equal a fixed pressure, normally 550 psig, which was maintained during the experiment. The stirring was allowed to continue for the specified time, and the activity was noted by recording the flow of ethylene into the reactor to maintain pressure.

After the allotted time, usually about one hour, the ethylene flow was stopped, and the reactor slowly depressurized and opened to recover a granular polymer. In all cases, the reactor was clean with no indication of any wall scale, coating or other forms of fouling. The polymer was removed and weighed.

Control Examples 1–2 (No Oxide Compound)

This experiment demonstrates that an organometal compound solution added to the reactor with an organoaluminum compound does not provide any activity. A polymerization run was made as described previously. First, 2 milliliters of bis(n-butylcyclopentadienyl) zirconium dichloride solution (0.5 grams per 100 ml of toluene) were added. Then, half of the one liter of isobutane was added followed by 2 milliliters of 15% by weight TEA in example 1 or 2 milliliters of 25% by weight ethylaluminum dichloride (EADC) in example 2. The other half of the isobutane, and finally, ethylene was added. No activity was observed. After one hour of stirring, the reactor was depressurized and opened, but in each case, no polymer was found. These results are shown in Table 1.

Control Examples 3–7 (Oxide Compounds):

This experiment demonstrates that an organometal compound solution added to the reactor with an organoaluminum compound and with an oxide compound provides only marginal activity. Each of the oxide compounds described previously in this disclosure was added to the reactor, followed by the organometal compound and TEA solutions as used in the procedure previously discussed. These runs are shown in Table 1, which lists the amount of oxide compounds charged, the run time in minutes, and the amount of polymer in grams produced by this combination.

The silica produced almost no polymer. The alumina, which is regarded as more acidic than the silica, produced more polymer, but still the activity was very low. This was true of all three different activation temperatures tested. The silica-alumina also exhibited only marginal activity.

Control Examples 8 and 9: (Chlorided Alumina)

The following runs were made to demonstrate the activity of the chlorided alumina. A small amount of the chlorided alumina was placed in the reactor with TEA but no organometal compound (Example 8). No activity was obtained. Then, the run was repeated (Example 9) except the organometal compound was added to the reactor. This time polymer was obtained in the amount of 351.5 grams, for an activity of 1627 grams of polymer per gram of chlorided alumina per hour.

Inventive Examples 10 and 11: (Chlorided, Vanadium-Containing Alumina)

A polymerization run was made using a chlorided, vanadium-containing alumina (Example 10). TEA and an organometal compound were added to the reactor. An activity of 6025 grams of polymer per gram of chlorided, vanadium-containing alumina per hour was observed. Thus, the vanadium addition improved the activity by almost 400%.

Of course, vanadium itself can sometimes finction as an active catalyst for polymerization, and therefore, another polymerization run was made with the chlorided, vanadium-containing alumina, except that no organometal compound was added to the reactor. In this run (Example 11), the activity was found to be 107 grams of polymer per gram of chlorided, vanadium-containing alumina per hour. This indicates that although the vanadium provided some low activity, most of the improvement was the result of vanadium acting as an activator for the organometal compound.

However, this low residual activity of vanadium has a useful effect on the polymer properties. The polymer obtained in Example 11 from the chlorided, vanadium-containing alumina was found to have a melt index of 0.04 g/10 min. and a high load melt index of 0.88 g/10 min., indicating that it had a very high molecular weight. Thus, when a treated solid oxide compound is used in combination with an organometal compound, a slightly broader molecular weight distribution occurs due to the presence of a small high molecular weight component produced from the treated solid oxide compound itself. In this way, the polymer is different from polymers produced using typical organometal compounds. The polymer obtained thusly in Example 10 was found to have a melt index of 0.21 g/10 min and a high load melt index of 4.0 g/10min, both indicating a lower composite molecular weight than that of Example 11.

The high molecular weight component has been found to improve melt strength in film and other applications. Thus, contribution of the treated solid oxide compound has the effect of increasing the overall molecular weight and broadening the overall molecular weight distribution. An example of this effect is shown in Table 2, where the treated solid oxide compound is compared to chlorided alumina.

TABLE 1

| Example | Test Compound* | Calcining Temp. (C.) | Test Compound Charged (g) | Organo-metal Compound | Organo-aluminum Compound (mmol) | Polymer (g) | Run Time (min) | Activity (g/g/h*) |
|---|---|---|---|---|---|---|---|---|
| 1-Control | No Oxide | | 0.0000 | Yes | 2 (TEA) | 0 | 61.1 | 0 |
| 2-Control | No Oxide | | 0.0000 | Yes | 2 (EADC) | 0 | 28.0 | 0 |
| 3-Control | Silica | 600 | 0.5686 | Yes | 2 (TEA) | 0.65 | 63.0 | 1 |
| 4-Control | Alumina | 800 | 0.6948 | Yes | 1 (TEA) | 2.7 | 30.7 | 8 |
| 5-Control | Alumina | 600 | 0.2361 | Yes | 2 (TEA) | 6.9 | 60.9 | 29 |
| 6-Control | Alumina | 400 | 0.8475 | Yes | 1 (TEA) | trace | 57.2 | 0 |
| 7-Control | Silica-Alumina | 600 | 0.3912 | Yes | 1 (TEA) | 8.3 | 40.0 | 32 |
| 8-Control | Cl-Alumina | 600 | 0.5183 | No | 2 (TEA) | 0 | 60.0 | 0 |
| 9-Control | Cl-Alumina | 600 | 0.2058 | Yes | 1 (TEA) | 351.5 | 63.0 | 1627 |
| 10-Invention | Cl-V/Alumina | 600 | 0.0360 | Yes | 1 (TEA) | 236.0 | 65.3 | 6023 |
| 11-Invention | Cl-V/Alumina | 600 | 0.3211 | No | 1 (TEA) | 19 | 33.1 | 107 |

*Test Compound = oxide compound or inventive treated solid oxide compound;
Activity in grams of polymer per gram of test compound charged per hour;
Polymerization at 90° C., 550 psig, and 1.2 liters of isobutane;
Organometal compound = 25 micromoles bis (n-butyl cyclopentadienyl) zirconium dichloride, 2.3 mg Zr;
Organoaluminum compound = 1 or 2 milliliters of 15% by weight triethylaluminum (TEA)

TABLE 2

| Test Compound | Activity (g/g/h) | HLMI (g/10 min.) | HLMI/MI | $Mn^*$ | $Mw^*$ | Mw/Mn |
|---|---|---|---|---|---|---|
| Chlorided Alumina | 939 | 10.6 | 16.7 | 50,200 | 126,000 | 2.5 |
| Chlorided, Vanadium-Containing Alumina | 6556 | 3.9 | 19.0 | 90,100 | 240,000 | 2.7 |

*Activity is defined as grams of polymer produced per gram of test compound per hour (g/g/h).
*Mn = number average molecular weight.
*Mw = weight average molecular weight.

While this invention has been described in detail for the purpose of illustration, it is not intended to be limited thereby but is intended to cover all changes and modifications within the spirit and scope thereof.

That which is claimed is:

1. A process to produce a catalyst composition, said process comprising contacting at least one organometal compound, at least one organoaluminum compound, and at least one treated solid oxide compound to produce said catalyst composition, wherein said organometal compound has the following general formula:

$(X^1)(X^2)(X^3)(X^4)M^1$ wherein $M^1$ is selected from the group consisting of titanium, zirconium, and hafnium;

wherein $(X^1)$ is independently selected from the group consisting of cyclopentadienyls, indenyls, fluorenyls, substituted cyclopentadienyls, substituted indenyls, and substituted fluorenyls;

wherein substituents on said substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, boron groups, and germanium groups;

wherein at least one substituent on $(X^1)$ can be a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein $(X^2)$ is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substituents on $(X^2)$ are selected from the group consisting of aliphatic groups, cyclic groups, combinations of aliphatic groups and cyclic groups, silyl groups, alkyl halide groups, halides, organometallic groups, phosphorus groups, nitrogen groups, boron groups, and germanium groups;

wherein at least one substituent on $(X^2)$ can be a bridging group which connects $(X^1)$ and $(X^2)$;

wherein said organoaluminum compound has the general formula:

$Al(X^5)_n(X^6)_{3-n}$ wherein $(X^5)$ is a hydrocarbyl having from 1 to about 20 carbon atoms;

wherein $(X^6)$ is a halide, hydride, or alkoxide; and wherein "n" is a number from 1 to 3 inclusive; and wherein said treated solid oxide compound is produced by a process comprising: 1) contacting a solid oxide compound with at least one vanadium-containing compound to produce a vanadium-containing solid oxide compound; 2) calcining said vanadium-containing solid oxide compound; and 3) contacting said vanadium-containing solid oxide compound with at least one halogen-containing compound to produce said treated solid oxide compound;
- wherein said halogen is selected from the group consisting of chlorine and bromine;
- wherein said solid oxide compound is selected from the group consisting of alumina, aluminophosphate, aluminosilicate, and mixtures thereof.

2. A process according to claim 1 wherein said treated solid oxide compound is contacted with at least one compound selected from the group consisting of organovanadium compounds, vanadium halide compounds, organotitanium compounds, titanium halide compounds, organoaluminum compounds, organoaluminum halide compounds, and mixtures thereof.

3. A process to produce a catalyst composition, said process comprising:
1) contacting alumina with an aqueous solution containing vanadyl sulfate to produce a vanadium-containing alumina having from 1 to 3 millimoles vanadium per gram of vanadium-containing alumina before cacining;
2) calcining the vanadium-containing alumina at a temperature within a range of 400 to 700° C. for 3 to 20 hours to produce a calcined composition;
3) contacting said calcined composition with carbon tetrachloride for 10 minutes to 30 minutes to produce a chlorided, vanadium-containing alumina have from 15 to 75% by weight chlorine based on the weight of the chlorided, vanadium-containing alumina before calcining;
4) combining said chlorided, vanadium-containing alumina and bis(n-butylcyclopentadienyl) zirconium dichloride at a temperature within the range of 15° C. to 80° C. to produce a mixture; and
5) after between 1 minute and 1 hour, combining the mixture and triethylaluminum to produce the catalyst composition.

4. A process according to claim 3 wherein said process consists essentially of steps (1), (2), (3), (4), and (5).

5. A catalyst composition produced by the process of claim 1.

6. A catalyst composition according to claim 5 wherein said catalyst composition has an activity greater than 2000 gm polymer/gm treated solid oxide/hr under slurry polymerization conditions, using isobutane as a diluent, with a polymerization temperature of 90° C., and an ethylene pressure of 550 psig.

7. A process according to claim 6 wherein said catalyst composition has an activity greater than 3000 gm polymer/gm treated solid oxide/hr under slurry polymerization conditions, using isobutane as a diluent, with a polymerization temperature of 90° C., and an ethylene pressure of 550 psig.

8. A catalyst composition according to claim 6 wherein the weight ratio of said organoaluminum compound to said treated solid oxide compound in said catalyst composition ranges from about 3:1 to about 1:100.

9. A catalyst composition according to claim 8 wherein said weight ratio of said organoaluminum compound to said treated solid oxide compound in said catalyst composition ranges from 1:1 to 1:50.

10. A catalyst composition according to claim 6 wherein the weight ratio of said treated solid oxide compound to said organometal compound in said catalyst composition ranges from about 1000:1 to about 10:1.

11. A catalyst composition according to claim 10 wherein said weight ratio of said treated solid oxide compound to said organometal compound in said catalyst composition ranges from 250:1 to 20:1.

12. A catalyst composition according to claim 11 wherein said treated solid oxide compound comprises alumina before calcining, 1 to 3 millimoles of vanadium per gram of vanadium-containing alumina, from 15 to 75% by weight chlorine based on the weight of said treated solid oxide compound before calcining, and is calcined for 3 to 20 hours at a temperature from 400 to 700° C.

13. A catalyst composition produced by the process of claim 3.

14. A catalyst composition according to claim 5 wherein said organometal compound is selected from the group consisting of bis(cyclopentadienyl)hafnium dichloride, bis (cyclopentadienyl)zirconium dichloride, 1,2-ethanediylbis ($\eta^5$-1-indenyl)di-n-butoxyhafnium, 1,2-ethanediylbis($\eta^5$-1-indenyl)dimethylzirconium, 3,3-pentanediylbis($\eta^5$-4,5,6,7-tetrahydro-1-indenyl)hafnium dichloride, methylphenylsilylbis($\eta^5$-4,5,6,7-tetrahydro-1-indenyl) zirconium dichloride, bis(n-butylcyclopentadienyl)di-t-butylamido hafnium, bis(n-butylcyclopentadienyl) zirconium dichloride; dimethylsilylbis(1-indenyl) zirconium dichloride, nonyl(phenyl)silylbis(1-indenyl) hafnium dichlioride, dimethylsilylbis($\eta^5$-4,5,6,7-tetrahydro-1-indenyl)zirconium dichloride, dimethylsilylbis(2-methyl-1-indenyl)zirconium dichloride, 1,2-ethanediylbis(9-fluorenyl)zirconium dichloride, indenyl diethoxy titanium (IV) chloride, (isopropylamidodimethylsilyl) cyclopentadienyltitanium dichloride, bis (pentamethylcyclopentadienyl)zirconium dichloride, bis (indenyl)zirconium dichloride, methyloctylsilyl bis (9-fluorenyl) zirconium dichloride, and bis-[1-(N,N-diisopropylamino)boratabenzene]hydridozirconium trifluoromethylsulfonate.

15. A catalyst composition according to claim 5 wherein the amount of halogen present in said treated solid oxide compound is in the range of about 10% to about 100% by weight where the weight percents are based on the weight of the treated solid oxide compound before calcining.

16. A catalyst composition according to claim 15 wherein the amount of halogen present in said treated solid oxide compound is in the range of 15% to 75% by weight where the weight percents are based on the weight of the treated solid oxide compound before calcining.

17. A catalyst composition according to claim 5 wherein the amount of vanadium present in said vanadium-containing solid oxide compound is in a range of about 0.5 to about 5 millimoles per gram of vanadium-containing solid oxide compound before calcining.

18. A catalyst composition according to claim 17 wherein the amount of vanadium present in said vanadium-containing solid oxide compound is in a range of about 1 to about 3 millimoles per gram of vanadium-containing solid oxide compound before calcining.

19. A catalyst composition according to claim 5 wherein said treated solid oxide compound is calcined at a temperature in a range of 300° C. to 800° C. and a time in a range of 1 hours to 50 hours.

20. A catalyst composition produced by the process of claim 2.

21. A process according to claim 1 wherein said organometal compound, said treated solid oxide compound, and said organoaluminum are combined by 1) contacting said organometal compound and said treated solid oxide compound for about 1 minute to about 24 hours at a temperature from about 10° C. to about 200° C. to form a first mixture; and 2) contacting said first mixture with said organoaluminum compound to form said catalyst composition.

22. A process according to claim 21 wherein said organometal compound, said treated solid oxide compound, and said organoaluminum are combined by 1) contacting said organometal compound and said treated solid oxide compound for 1 minute to 1 hour at a temperature from 15° C. to 80° C. to form a first mixture; and 2) contacting said first mixture with said organoaluminum compound to form said catalyst composition.

23. A process according to claim 1 wherein said vanadium-containing solid oxide compound is calcined at a temperature in a range of about 300° C. to about 800° C. and a time in a range of about 1 hour to about 50 hours.

24. A process according to claim 23 wherein said vanadium-containing solid oxide compound is calcined at a temperature in a range of 400° C. to 700° C. and a time in a range of 3 hours to 20 hours.

25. A process according to claim 1 wherein said treated solid oxide compound is produced by simultaneously calcining and contacting said vanadium-containing solid oxide compound with said halogen-containing compound.

26. A process according to claim 25 wherein said vanadium-containing solid oxide compound is calcined at a temperature in a range of about 300° C. to about 800° C. for about 5 minutes to about 2 hours to produce said treated solid oxide compound.

27. A process according to claim 1 wherein the amount of vanadium present in said vanadium-containing solid oxide compound is in a range of about 0.5 to about 5 millimoles per gram of vanadium-containing solid oxide compound before calcining.

28. A process according to claim 27 wherein the amount of vanadium present in said vanadium-containing solid oxide compound is in a range of about 1 to about 3 millimoles per gram of vanadium-containing solid oxide compound before calcining.

29. A process according to claim 1 wherein the amount of halogen present in said treated solid oxide compound is in the range of about 10% to about 100% by weight where the weight percents are based on the weight of the treated solid oxide compound before calcining.

30. A process according to claim 29 wherein the amount of halogen present in said treated solid oxide compound is in the range of about 15% to about 75% by weight where the weight percents are based on the weight of the treated solid oxide compound before calcining.

31. A process according to claim 1 consisting essentially of contacting said organometal compound, said treated solid oxide compound, and said organoaluminum compound with each other to produce said catalyst composition.

32. A process according to claim 31 wherein said vanadium-containing solid oxide compound is calcined at a temperature in a range of 400° C. to 700° C. and a time in a range of 3 hours to 20 hours.

33. A process according to claim 1 wherein said organometal compound, said organoaluminum compound, and said treated solid oxide compound are contacted with each other for 1 minute to 1 hour at a temperature in a range of 20° C. to 80° C.

34. A process according to claim 31 wherein said organometal compound, said treated solid oxide compound, and said organoaluminum are combined by 1) contacting said organometal compound and said treated solid oxide compound for 1 minute to 1 hour at a temperature from 15° C. to 80° C. to form a first mixture; and 2) contacting said first mixture with said organoaluminum compound to form said catalyst composition.

35. A process according to claim 31 wherein said organometal compound, said organoaluminum compound, and said treated solid oxide compound are contacted with each other for 1 minute to 1 hour at a temperature in a range of 20° C. to 80° C before use.

* * * * *